March 14, 1967  B. D. MONTGOMERY  3,308,913
CLUTCH
Filed Sept. 11, 1964  3 Sheets-Sheet 3
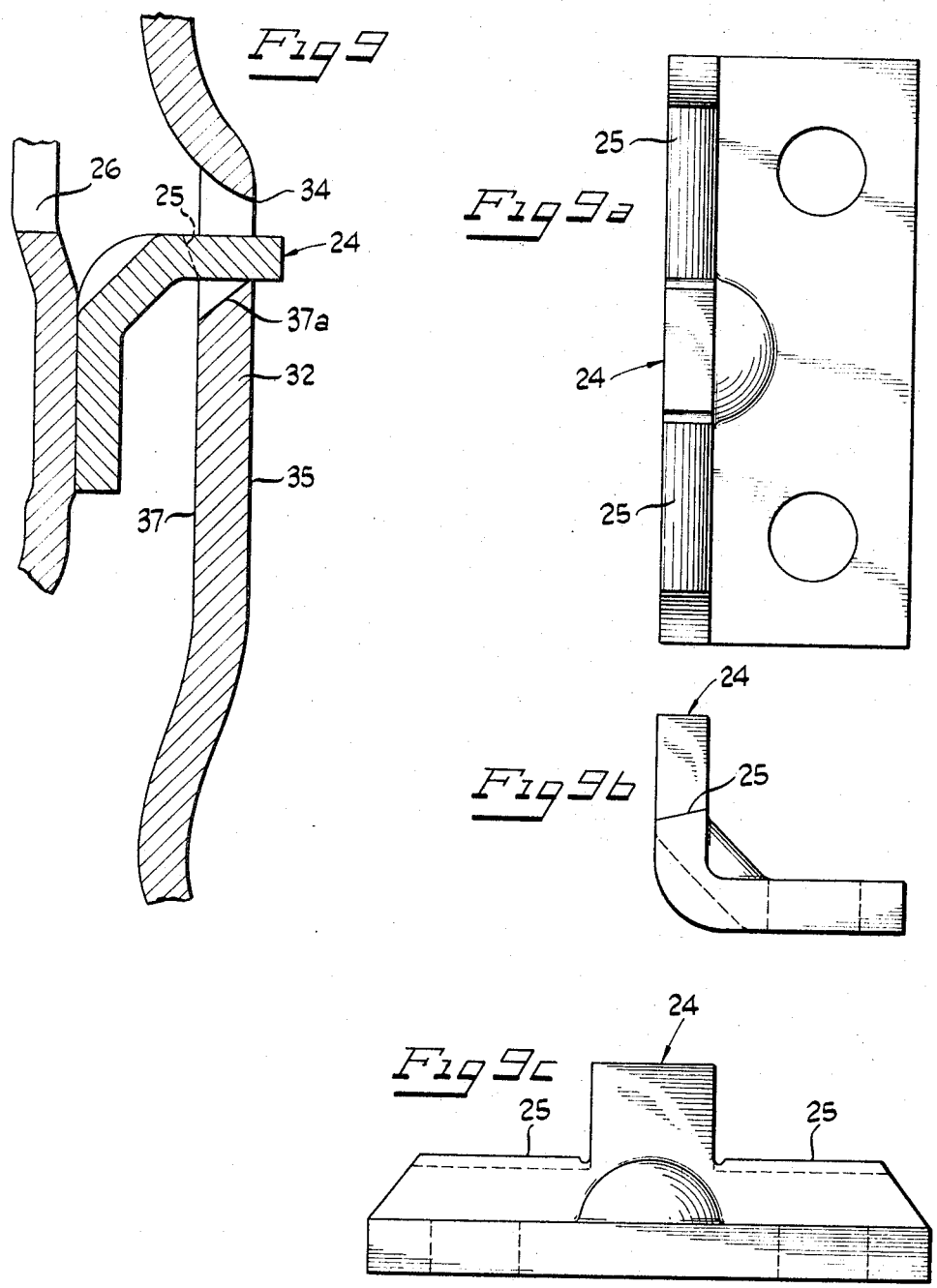
INVENTOR
BYRON D. MONTGOMERY

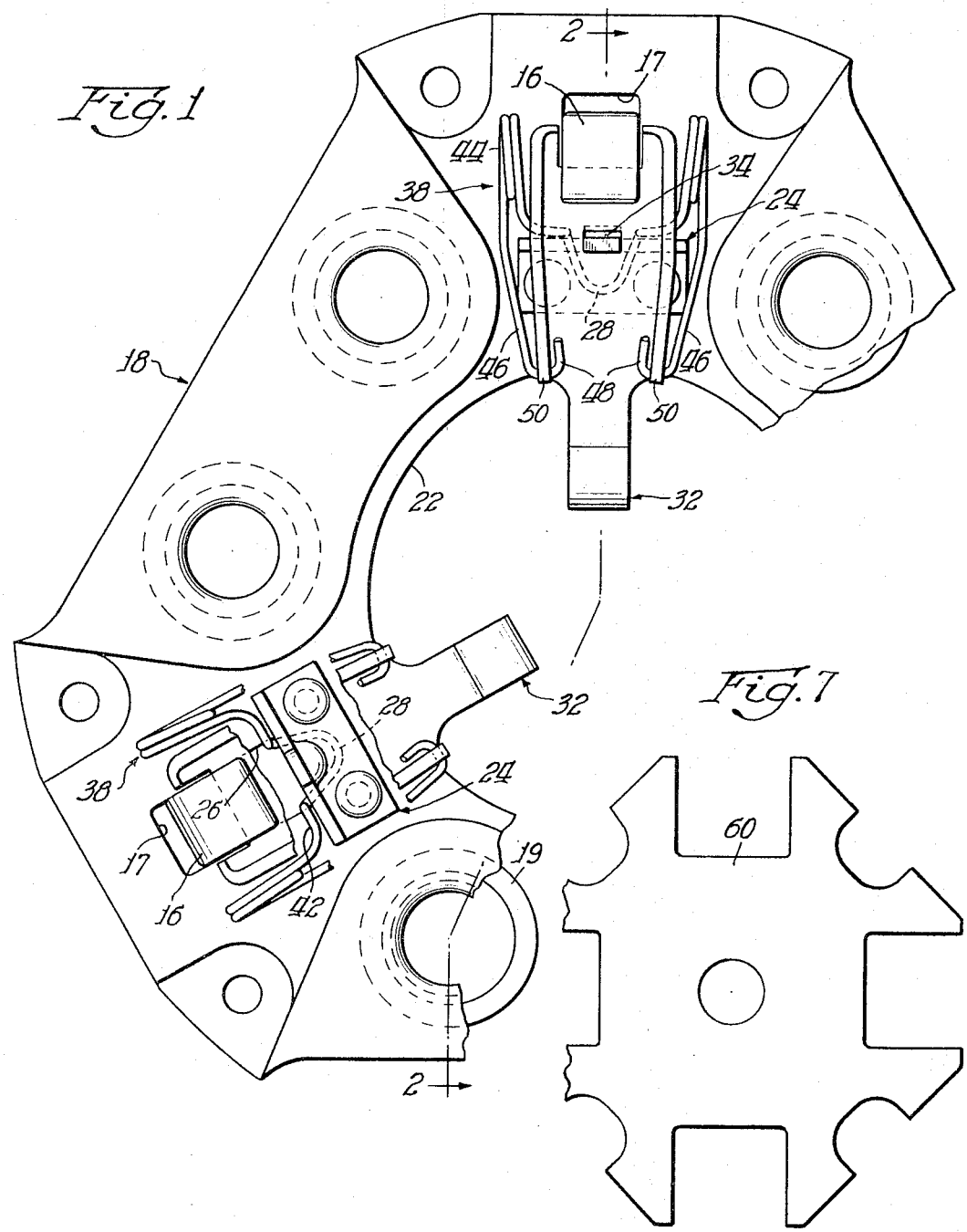

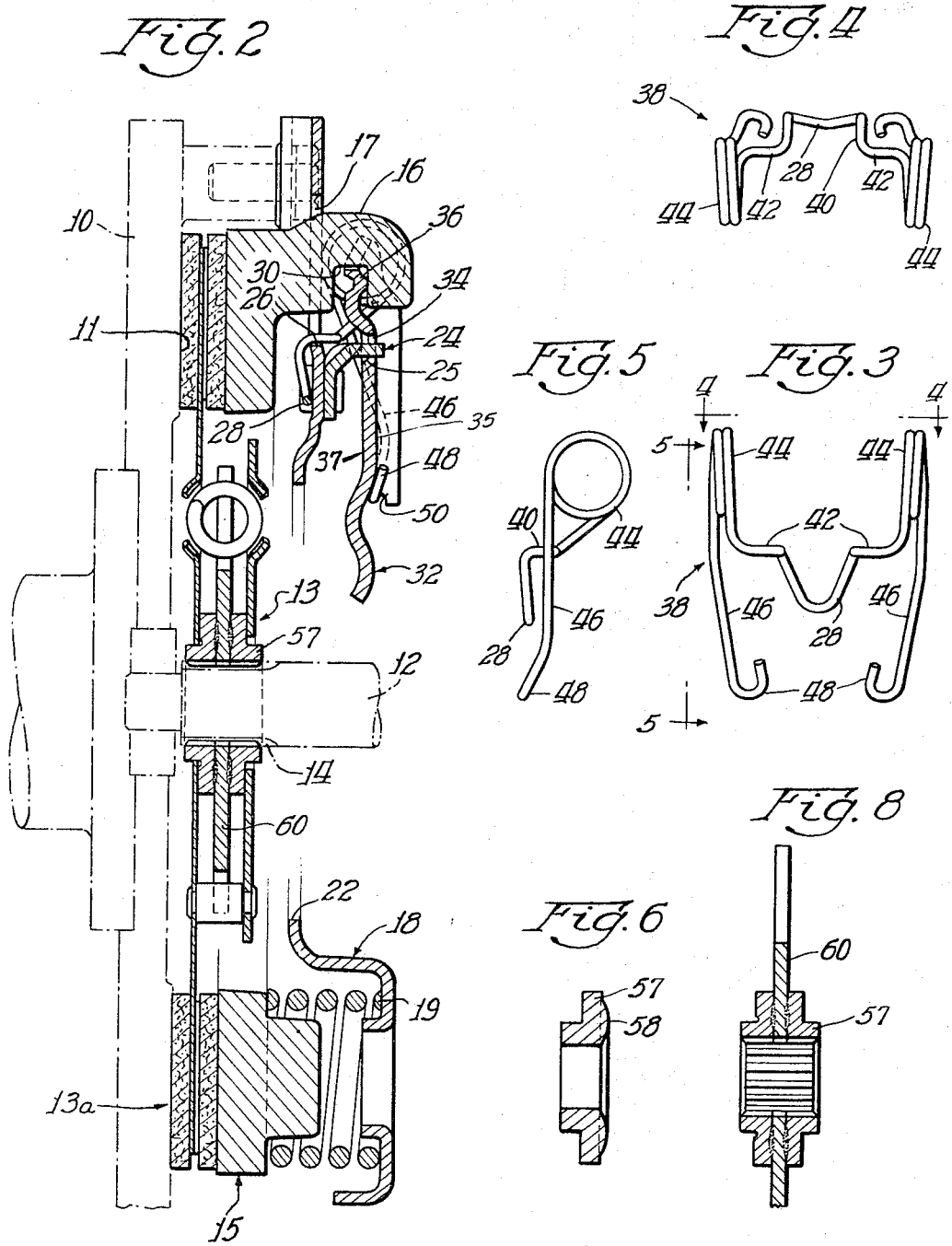

United States Patent Office 3,308,913
Patented Mar. 14, 1967

3,308,913
CLUTCH
Byron D. Montgomery, Birmingham, Mich., assignor to Borg-Warner Corporation, Chicago, Ill., a corporation of Illinois
Substituted for abandoned application Ser. No. 130,784, Aug. 11, 1961. This application Sept. 11, 1964, Ser. No. 398,471
1 Claim. (Cl. 192—68)

This application is a substitute of application Serial No. 130,784, filed Aug. 11, 1961, now abandoned.

This invention relates to friction clutches of the type employed in motor vehicles.

Briefly described, this invention relates to a clutch construction which includes a pressure plate, a stamped sheet metal cover plate, and stamped sheet metal release levers wherein the release levers are mounted on the exterior portion of the cover plate. The cover plate includes fulcrum members which are adapted to be engaged by each lever. The cover plate has a plurality of openings formed therein which are adapted to receive pressure plate drive lugs. The release levers are held in engagement with the cover plate and with the pressure plate drive lugs by a novel lever actuating spring member. An important feature of this clutch construction is the fact that the release levers and the lever actuating springs may be removed from the cover plate without removing the cover plate from the engagement with the fly wheel. More particularly, the release levers and the lever actuating springs can be readily assembled and disassembled simply by disconnecting the lever actuating springs from engagement with the release levers. The flanged hub portion of the clutch driven member assembly is fabricated by welding two cold headed slugs to a stamped metal disc. The clutch construction disclosed herein results in a complete assembly which is of unusually short axial length and low in cost.

Additional advantages of the invention contemplated herein will be apparent after considering the description hereinafter set forth in connection with the drawing annexed hereto. Reference is now made to the accompanying drawing forming a part of this specification.

In the drawings:

FIG. 1 is an end view of the clutch assembly;

FIG. 2 is a view, partially in cross-section, taken along the lines 2—2 of FIG. 1;

FIG. 3 is a plan view of the release lever spring;

FIG. 4 is a view of the release lever spring taken along lines 4—4 of FIG. 3;

FIG. 5 is a view of the release lever spring taken along section lines 5—5 of FIG. 3;

FIG. 6 is a view, in cross section, of the cold headed steel slug used to fabricate the hub portion of the driven member;

FIG. 7 is a view of the stamped disc used to fabricate the hub portion of the driven member; and FIG. 8 is a view, in cross section, of the hub portion of the driven member assembly.

FIGURE 9 is an enlarged fragmentary view of a portion of the apparatus of FIGURE 2.

FIGURES 9A, 9B and 9C are additional views on an enlarged scale of a portion of the apparatus shown in FIGURE 9.

Referring now to the drawing, and more particularly to FIGS. 1 and 2, the clutch assembly includes a flywheel 10 having a clutch face 11, a transmission or output shaft 12, a driven member generally indicated at 13 which is secured upon a splined end 14 of the transmission shaft 12, and a pressure plate 15 having drive lugs 16 which extend through openings 17 in a cover plate 18. The cover plate 18 is secured to the flywheel 10 by using conventional stud bolts. A plurality of compression coil springs 19 are disposed between the cover plate 18 and the pressure plate 15. The coil springs 19 normally urge the pressure plate inwardly to effect engagement of the friction facings 13a of the driven member 13 between the flywheen face 11 and the pressure plate 15. This engagement of the driven member with the flywheel transfers driving torque from the flywheel 10 to the driven shaft 12. The flywheel 10 transmits torque to the cover plate 18 which rotates the pressure plate 15. The drive lugs 16 of the pressure plate are positioned within the openings 17 in the cover plate. These drive lugs 16 engage opposite sides of the openings 17 to provide a driving connection between the cover plate and the pressure plate while permitting movement of the pressure plate axially with respect to the cover plate. The cover plate 18 is preferably of stamped metal construction. The central portion of the cover plate is formed with a circular centrally located opening 22.

The exterior portion of the cover plate 18 has attached thereto a plurality of fulcrum members 24. Each of the fulcrum members 24 seats upon an embossed portion 26 formed in the cover plate. The embossed portion provides a recess at the underside of the cover plate. Each of the drive lugs 16 has a recess 30 formed therein for receipt of one end portion of the release lever 32. Each release lever 32 is provided with a fulcrum engaging means 34 and a recess engaging means 36. The release levers 32 are positioned outside the cover plate 18 and are held in engagement with the recess 30 and the fulcrum means 24 by way of a lever spring indicated generally as 38 (FIGS. 3, 4 and 5).

Referring now to FIGS. 3, 4 and 5, a release lever spring includes an anchor portion 28, an intermediate portion 40, laterally extending portions 42, coiled portions 44, lever engaging arm portions 46, and hook portions 48 which are adapted to engage side plates 50 (FIG. 2) of the release lever.

The release levers are installed on the cover plate by positioning the release lever spring 38 such that the anchor portion 28 extends through the opening 17 and the lever engaging arms 46 extend inwardly toward the central portion of the cover plate. The recess engaging means 36 of the release levers are positioned within recesses 30 such that the fulcrum engaging means 34 are engaged with their respective fulcrum means 24. The hook portions 48 of the release lever springs 38 are then engaged with their respective side plates 50 of the release levers. The release lever springs, in combination with the recesses 30 and the fulcrum means 24 maintain the release levers in a position on the cover plates.

The flanged hub portion of the driven member is preferably fabricated from cold headed steel slugs and a stamped disc portion. FIG. 6 illustrates one of the cold headed slugs 57 used in fabricating the hub portion of the driven member. The cold headed steel slug is preferably of a cylindrical flanged configuration and preferably includes an annular projection 58 on one face thereof. One slug is placed on each side of a stamped disc 60 (FIG. 7) such that the annular projections 58 face toward and are in engagement with the stamped disc 60. Pressure is applied in an axial direction to the three component subassembly, i.e. the two slugs 57 and the stamped disc 60. An electrical current is then passed through the sub-assembly by suitable wiring connections (not shown).

The heat generated from the flow of current through the sub-assembly builds up a high internal temperature in the annular projections 58 causing the two cold headed slugs, to weld to the disc portion 60 thus forming an integral flanged hub unit. The hub portion is then machined to remove undesirable metal therefrom. The hub portion is bored centrally and provided with splines.

As seen in FIGURES 9 and 9A, 9B and 9C, the fulcrum member 24 includes a chamfered portions 25 upon which the lever seats. The point of contact between the fulcrum and the lever is located along a line at the outer edge of the lever, that is to say, the contact point is between the radial outer edge and the radial center of the arm making the lever arm acted upon by the release bearing relatively longer than the lever arm acting upon drive lugs 16. This arrangement provides a high mechanical advantage in the lever thereby reducing force required at the bearing (not shown) to release the clutch.

As best seen in FIGURE 9 the fulcrum opening 34 in the lever is chamfered at the bottom side of the lever as at 37 so that the point of contact between the lever and the fulcrum member, due to centrifugal force acting on the lever, is along a line at the outer side 35 of the lever. The purpose of this is to relate the axial location of the contact point to the axial location of the center of gravity of the lever, to favor the inner side 37 of the lever thrusting toward the engine due to centrifugal unbalance in the lever at high engine speed. If the unbalance is in the opposite direction the levers ride the bearing causing objectionable noise and wear.

It is to be understood that the invention as disclosed herein is not limited to the specific construction and arrangement shown and described, but is limited only by the scope of the appended claim. It will be understood by those skilled in the art that minor changes in the construction and arrangement may be made without departing from the spirit and the intent of this invention.

I claim:

In a clutch assembly having a driven member, a pressure plate having drive lugs extending laterally therefrom with a recess formed on each of said lugs, and a cover plate having a plurality of openings formed therein to receive said lugs, the improvement comprising; a plurality of fulcrum means on the exterior surface of said cover plate which include a portion extending from said cover plate having a surface disposed adjacent said lugs, a chamfered portion defining with said extending surface a fulcrum line generally parallel to the exterior surface of said cover plate and spaced therefrom, a plurality of release levers having an end portion adapted to engage said recess and being adapted to contact said fulcrum means along said fulcrum line, said lever arms further including a fulcrum engaging means provided with a chamfered portion adapted to contact said fulcrum means along a fulcrum line disposed generally parallel to said exterior surface of said cover plate and spaced therefrom a distance greater than the distance between said exterior surface of said cover plate and said first mentioned fulcrum line, and a plurality of release lever springs positioned between said release levers and said cover plate to hold said release levers on said cover plate and to urge said end portion of said release levers into engagement with said recess.

References Cited by the Examiner

UNITED STATES PATENTS

| | | | |
|---|---|---|---|
| 1,675,063 | 6/1928 | Spase | 192—68 |
| 1,868,764 | 7/1932 | Reed | 192—68 |
| 1,882,898 | 10/1932 | Reed | 192—68 |
| 1,896,968 | 2/1933 | Paton. | |
| 2,405,357 | 8/1946 | Jarrett | 192—99 |
| 2,407,727 | 9/1946 | Spase | 192—99 |
| 2,407,728 | 9/1946 | Spase | 192—99 X |
| 2,601,912 | 7/1952 | Reed | 192—99 |
| 2,801,723 | 8/1957 | Binder | 192—99 |

DAVID J. WILLIAMOWSKY, Jr., *Primary Examiner.*

A. T. McKEON, *Assistant Examiner.*